April 3, 1928. 1,665,057

L. GENEST

TICKETS HOLDER

Filed Dec. 9, 1926

Inventor.
LUCIEN GENEST by
Attorney.

Patented Apr. 3, 1928.

1,665,057

UNITED STATES PATENT OFFICE.

LUCIEN GENEST, OF MONTREAL, QUEBEC, CANADA.

TICKETS HOLDER.

Application filed December 9, 1926. Serial No. 153,656.

The present invention relates to improvements in ticket holder which will be hereinafter fully described and is illustrated in the accompanying drawings, in which:—

Like numerals of reference indicate corresponding parts in each figure.

Figure 3:
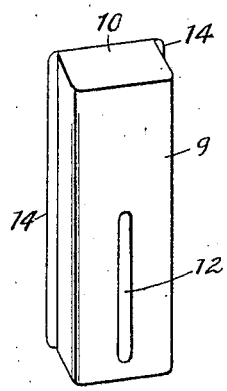
Figure 3 is a perspective view of the detachable casing.
Figure 4:
Figure 4 is a perspective view of the pressure weight.
Figure 5:
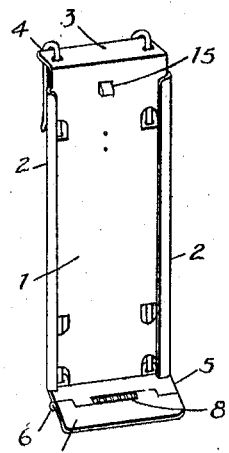
Figure 5 is a perspective view of the base or back board upon which are provided the slide and securing hook and hinged closing plate.
Figure 1:
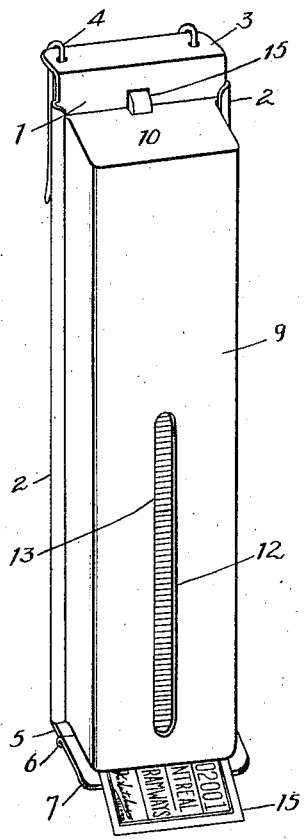
Figure 1 is a perspective view of a device according to the invention with strips of tickets therein.
Figure 2:
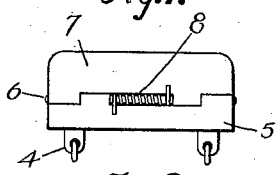
Figure 2 is a bottom view of Figure 1.
Figure 6:
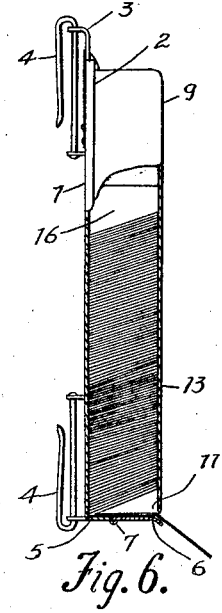
Figure 6 is a side elevation view partly broken away to show the arrangement of the ticket strips therein.

Referring to the drawings, 1 is a rectangular elongated base plate having the bent portions 2 forming a guide and the bent flap 3 at one end thereof through which project one or more hooks 4, by means of which the ticket holder is secured or attached to the belt or to one of the coat pockets of the user. The lower portion of the base plate 1 is also provided with an angularly projecting flap 5 upon which is hinged at 6 the closing plate 7 and 8 is a coiled spring adapted to press the said closing plate upwardly against the open lower end of the casing 9.

The casing 9 is closed at its upper end by a cover plate 10 and open at its lower end, and 12 is an elongated opening, by means of which the number of tickets 13 in the casing may be readily seen. Each side of the casing 9 is bent outwardly so as to provide the flanges 14 which are adapted to engage the guides 2 in the base plate 1.

Once the casing 9 has been made to engage the guides 2, the spring-pressed detent 15 locks said casing in position.

Figure 7:
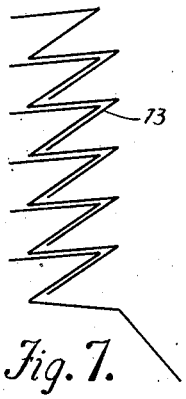
Figure 7 is a diagrammatic side view of the interlocking ticket strips.

In the casing 1 are piled the strips of tickets 13 which are preferably folded as disclosed in Figure 7 of the drawings, the first ticket of the lowermost strip projecting outwardly of the casing between the edge of the lower open end and the closing plate 7. Upon the uppermost strip is placed the pressure-weight 16 or any other suitable means, so as to continually press the tickets inside the casing. The strips of tickets 13 are so interlocked with one another, that upon pulling one strip outwardly through the open end of the casing, the adjacent strips will be pulled successively into position.

What I claim as my invention is:—

A dispensing ticket holder comprising a base plate having a pair of longitudinal grooves, a casing adapted to contain a plurality of folded tickets and having a pair of flanges slidable in said grooves, a second plate fixed to said base plate and projecting perpendicularly therefrom at the bottom thereof to limit the sliding movement of said casing in one direction, a spring-pressed detent adapted to engage said casing to limit its sliding movement in the opposite direction, and a spring-pressed closing plate hinged to said second plate and adapted to close the lower end of said casing.

Signed at Montreal, Quebec, Canada, this 5th day of July, 1926.

LUCIEN GENEST.